United States Patent [19]
Trovato et al.

[11] Patent Number: 5,835,881
[45] Date of Patent: Nov. 10, 1998

[54] PORTABLE SYSTEM FOR PROVIDING VOICE DRIVING DIRECTIONS

[75] Inventors: Karen I. Trovato, Putnam Valley; Daniel L. Pelletier, Peekskill, both of N.Y.

[73] Assignee: Philips Electronics North America Corporation, New York, N.Y.

[21] Appl. No.: 587,266

[22] Filed: Jan. 16, 1996

[51] Int. Cl.$^6$ .................................................. G06F 165/00
[52] U.S. Cl. ......................... 701/211; 701/200; 340/988
[58] Field of Search .................................. 701/200, 201, 701/202, 211, 212, 213, 208; 73/178 R; 340/988, 990, 995

[56] References Cited

U.S. PATENT DOCUMENTS

| | | | |
|---|---|---|---|
| 4,570,227 | 2/1986 | Tachi et al. | 701/202 |
| 4,679,147 | 7/1987 | Tsujii et al. | 701/211 |
| 4,882,696 | 11/1989 | Nimura et al. | 701/211 |
| 5,067,081 | 11/1991 | Person | 701/202 |
| 5,177,685 | 1/1993 | Davis et al. | 701/200 |
| 5,410,486 | 4/1995 | Kishi et al. | 701/211 |
| 5,452,212 | 9/1995 | Yokoyama et al. | 701/211 |
| 5,463,554 | 10/1995 | Araki et al. | 701/211 |
| 5,475,599 | 12/1995 | Yokoyama et al. | 701/211 |

OTHER PUBLICATIONS

Abstract—Driver performance results from the travtek IVHS camera car evaluation study, 1994.
Abstract—Design of TraVek auditory interface, 1992.
Abstract—Pathfinder status and implementation experience, 1991.
Abstract—Automobile navigation information systems. Legacy of the ancient Chinese south–pointing chariot, 1990.
Abstract—Dynamic route guidance and interactive transport management with ALI–SCOUT, 1991.
Abstract—Route Guidance System for Automobile Drivers by Speech Synthesis, 1987.
Abstract—An Electronic Traffic Pilot for Motorists, 1986.
Abstract—RMS1: the Microsystems'robot. I. Speech recognition, May 1985.
Abstract—'Intelligent' cars are already on the roads of Europe, Aug.–Sep. 1983.
"Communications: Teletrac's Agenda for Location Network Includes IVHS Services", Feb. 1, 1993.
"Turn–On, Tune–In to Latest Traffic News—Industries In Transition", Apr. 1995.
"Car Nav Points the Way to the Future–Japanese Market to Top Y200 Billion by 1995", apr. 1993.
"Greek Start–Up Seeks Capital Infusion for Navigation Roll Out", Mar. 1, 1993.

(List continued on next page.)

Primary Examiner—Gary Chin
Attorney, Agent, or Firm—Anne E. Barschall; Brian J. Wieghaus; David Schreiber

[57] ABSTRACT

A travel direction speaking system that is based on a portable laptop computer. The computer determines a route between an origin and a destination using an electronic map, and prepares driving instructions based on the route. Each driving instruction includes the spatial position (longitude and latitude) of a change in direction at which the driving instruction applies. The system includes a Global Positioning System (GPS) unit that provides the GPS determined position of the laptop computer. The computer compares the GPS position to the spatial position and outputs the corresponding driving instruction when the two positions are inferred to be within a specified range of each other. The range can be determined based distance or on a time period required to travel from the current position to a position at which the instructions should be spoken. The time period accounts for the amount of time required to speak the directions, for the reaction time of the driver at the speed that the laptop computer is moving within a vehicle and for an error in position associated with GPS commercial systems. When the time period has elapsed the directions are spoken. The system also includes a text to voice unit that converts the text driving instructions into a voice signal.

13 Claims, 5 Drawing Sheets

OTHER PUBLICATIONS

"Navigation: Boston Startup Aims Navigation System At Commercial Markets", Jun. 21, 1993.
"Smart Car Passes Test", Apr. 19, 1993.
"AT&T, Lockheed Become Latest Strategic Partners", Apr. 27, 1992.
"Toyota's GPS Voice Navigation System", Jul. 1992.

U.S. Application Entitled: Differential Budding: Method and Apparatus for Path Planning With Moving Obstacles and Goals, Ref. No. 1504–0384.

U.S. Application Entitled: Method and Apparatus for Path Planning, Ref. No. 1504–0355.

U.S. Application Entitled: Improved Very Long Instruction Word Processor Architecture, Ref. No. 1504–0689.

PORTABLE SYSTEM FOR PROVIDING VOICE DRIVING DIRECTIONS

BACKGROUND OF THE INVENTION

1. Field of the Invention

The present invention is directed to a portable system for providing voice or audio driving directions and, more particularly, to a portable laptop computer based system that creates a set of driving directions that includes spatial indicators of the points at which the driving direction should change, monitors the current position and the time or distance to a position at which the instructions should be issued and estimates or infers a time that voice instructions should begin in advance of the points of direction change.

2. Description of the Related Art

Systems currently exist that provide driving directions. Some of these systems are fixed base or position systems that print out a set of driving directions when the user enters an origin and a destination. Other systems are included in vehicles. These systems typically cannot be hand carried from vehicle to vehicle, that is, they are not hand portable. Such vehicle based systems also typically provide directions in the form of a route map displayed for review by the driver. The systems receive position information from Global Positioning System devices and dead-reckoning devices attached to a vehicle transmission. These systems require that the current location be matched precisely to the map using GPS and dead reckoning. At each turning point the user is notified. Other systems are available that do not plan routes but that show route progress along an electronic map.

What is needed is a portable system that infers its own location and based on that inferred location provides verbal driving instructions sufficiently in advance of a change in direction that the driver has enough time to listen to the instructions and make the change in direction.

SUMMARY OF THE INVENTION

It is an object of the present invention to provide a hand portable device that can provide driving direction instructions.

It is another object of the present invention to provide a device that provides directions verbally.

It is a further object of the present invention to provide a system that uses the estimated speed of travel, a predetermined drivers reaction time, a time for speaking the driving instruction message and a time for positional error to provide the instructions in advance of a turn.

It is an additional object of the present invention to indicate to the user that the user is off track or not on the path/route to the destination.

It is an object of the present invention to compute a time at which instructions should be spoken, which is translated into distance providing a target point around which a GPS error radius is calculated which radius is called a speech radius and when a point, a speech initiation point, on the radius is reached, there is enough time to speak the directions sufficiently in advance of the turn to allow the driver to make the turn.

It is another object of the present invention to allow the entry of origin and destination which are transmitted to a remote computer that generates and downloads driving instructions and targets and optionally all driving segments with road type and speed limits between the origin and destination, allowing the route to incorporate current-real time traffic information.

It is also an object of the present invention to allow the system to report progress along a route to a central station by indicating that various points along the route have been reached.

The above objects can be attained by a system that is based on a portable laptop computer. The computer determines a route between an origin and a destination using an electronic map. The computer prepares driving instructions based on the route with each driving instruction including the spatial position (longitude and latitude) of the turn at which the driving instruction applies. The system includes a Global Positioning System (GPS) unit that provides the GPS determined position of the laptop computer. The computer compares the GPS reading to the spatial position or setpoint and outputs the instruction when the two positions are within a specified range of each other. The range can be determined based on a time period required to travel from the current position to a position associated with a speech initiation point at which the instructions should be spoken. The time period accounts for the amount of time required to speak the directions, for the reaction time of the driver at the speed that the laptop computer is moving. The time period also accounts for the time to carry out the desired maneuver of the car at the speed and for an associated buffer time or distance which can be fixed or variable based on speed and is designed to allow for changes in driving conditions, road conditions, personal preference, etc. The speaking point accounts for an error in position associated with GPS. The speaking point is an inferred position of the system at which the instructions should be spoken. The time period and the associated speaking point time/distance can also be used to determine a distance from the setpoint point which is compared to the current position to trigger the speaking of the directions. The system also includes a text to voice unit that converts the text driving instructions into a voice signal.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
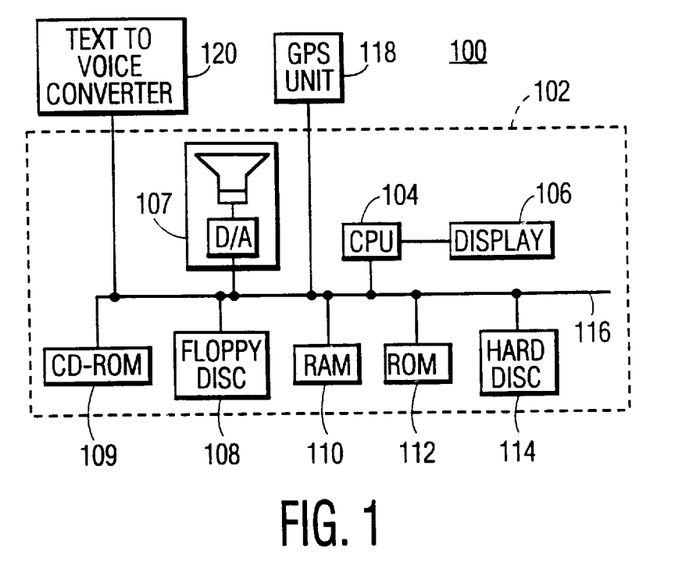
FIG. 1 depicts the components of the present invention.

The system 100 of the present invention is based on a typical portable laptop type computer system 102, such as illustrated in FIG. 1. Such systems 102 are produced by a number of companies and typically include a central processor 104 with an associated real time clock, a display 106, a keyboard (not shown), an audio unit 107 that includes a digital-to-analog converter and a speaker, and various types of memories 108, 109, 110, 112 and 114 connected to a system bus 116. The process databases described herein can be stored in the RAM 110, ROM 112, the hard disk 114 or a floppy disk or other portable media associated with a portable media device, such as the floppy disk drive 108 or CD ROM drive 109 or a PCMCIA flash card (not shown).

Various types of plug in units, as well as the software needed to use the units, are available for laptop computers. The present invention, in addition to the typical laptop components noted above, includes a conventional PCMCIA GPS unit 118, such as available from Rockwell International, that provides the longitude and latitude of the unit 118 and the current time based on signals from global positioning satellites. The present invention also includes a conventional text to voice converter 120. The converter 120 is preferably an integrated voice synthesizer which is part of the laptop 102 when it is produced. Of course the laptop can be produced with both the GPS unit 118 and the converter 120 if desired. The system 100 can also transmit the current status, including the set points that have been reached to a central station using the transmitter which is useful in traffic control.

Although not shown, it is possible for the laptop 102 to include a transmitter and a receiver, such as a cell phone with modem or a radio link like ARDIS, that can be used to send an origin and destination to a central traffic computer. The computer will determine a route based on current or real time traffic conditions, prepare appropriate driving instructions with turn or set points and download the instructions, etc. to the laptop system 102.

The system 100 also includes a conventional point to point software navigation package (a program and an electronic map database) of the type that can determine a route between an origin and a destination. These packages typically produce text driving instructions such as those set forth below.

---

Your Route from:
345 Scarborough Road, BRIARCLIFF MANOR, NY
To:
91 AMSTERDAM AVE, MANHATTAN, NY
About 31.2 miles, 56 minutes.

| | Total Miles | Directions |
|---|---|---|
| 1) | 0.0 | Start out going South on SCARBOROUGH RD towards LONG HILL RD W. Drive 1.0 miles. |
| 2) | 1.0 | Turn LEFT onto ALBANY POST RD. Drive 2.0 miles. |
| 3) | 3.0 | ALBANY POST RD becomes N BROADWAY. Drive 3.3 miles. |
| 4) | 6.3 | Take the I-287 EAST/I-87 SOUTH ramp. Drive 2.2 miles. |
| 5) | 8.5 | Take the SAW MILL RIVER PKWY SOUTH exit, exit number 7A. Drive 10.2 miles. |
| 6) | 18.7 | SAW MILL RIVER PKWY SOUTH RAMP becomes HENRY HUDSON PKY. Drive 9.9 miles. |
| 7) | 28.5 | Take the exit toward 96 ST. Drive 0.3 miles. |
| | 28.8 | Merge onto HENRY HUDSON PKY. Drive a short distance. |
| | 28.9 | Take the W 96TH ST EAST RAMP exit. Drive 0.3 miles. |
| | 29.1 | Turn RIGHT onto BROADWAY. Drive 1.8 miles. |
| 8) | 30.9 | Turn RIGHT onto W 62ND ST. Drive 0.2 miles. |
| 9) | 31.2 | Turn RIGHT onto AMSTERDAM AVE. Drive 0.1 miles to 91 AMSTERDAM AVE. |

---

Navigation packages such as those described above can also generate the spatial positions, particularly the longitude and latitude, of the map positions where a change in direction or a turn is located. They can also generate spatial position or progress points along the route. Such packages are readily available from a number of producers including Navigation Technologies of Sunnyvale, Calif. U.S. Pat. No. 4,949,277 also describes how to determine a path.

Figure 2:
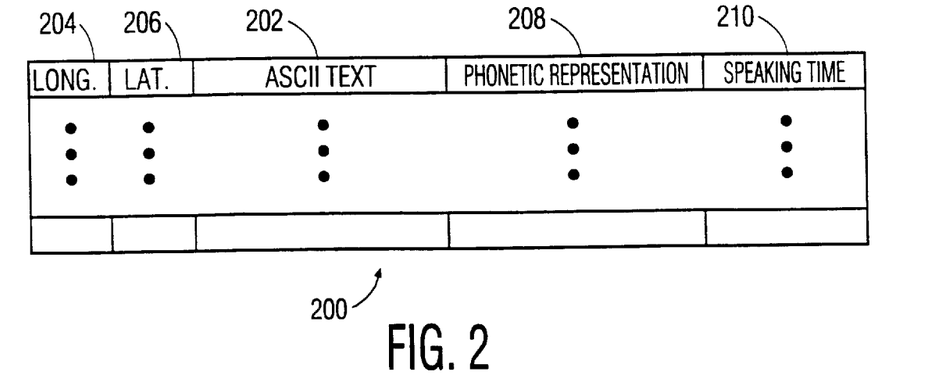
FIG. 2 depicts a typical data structure or database used in the present invention.

The text instructions and the corresponding spatial positions are preferably provided in a searchable data structure or database 200, such as the array illustrated in FIG. 2. This database 200 stores the text 202 of the driving instructions, like the text set forth above, and stores the longitude 204 and latitude 206 of the spatial positions of the turns or setpoints associated with the directions as well as of the origin and destination. The database 200 also preferably stores the phonetic representation 208 that is the equivalent of the text instructions which can be conventionally obtained from the text using a text to phonetic conversion system. The instructions can also be based on "canned" speech downloaded from a remote computer or a stored database of the laptop. The phonetic representation can then be converted into an audio voice signal that can be broadcast or made audible by a speaker. The database 200 preferably includes a speaking time variable 210 that indicates the time required for speaking the corresponding text using the corresponding phonetic representation. Other types of data structures, such as a linked list, or databases can also be used. The database 200 can also be used as temporary storage for the variables that are determined in the process of the present invention.

Before discussing the process performed by the present invention the conventions or definitions of various points along a route will be discussed. In the following discussion distance/time will be referenced. This flexible terminology is necessary because the instant during a trip at which a particular driving instruction is spoken can be inferred based on either a time period required to reach a set point or turn or on a distance from the setpoint. Whenever the fixed or variable parameter is time, the distance traveled in the time period can be calculated based on the current or posted speed on route. Whenever the parameter is distance, the time of travel can also be calculated based on the current or posted speed. The current speed can be estimated from the time and distance between the two GPS readings, preferably the most recent two. More complicated methods can also be used to determine the speed, for example, the average of the elapsed time of the two prior segments. And outliers can be discarded in this way.

Figure 3A:
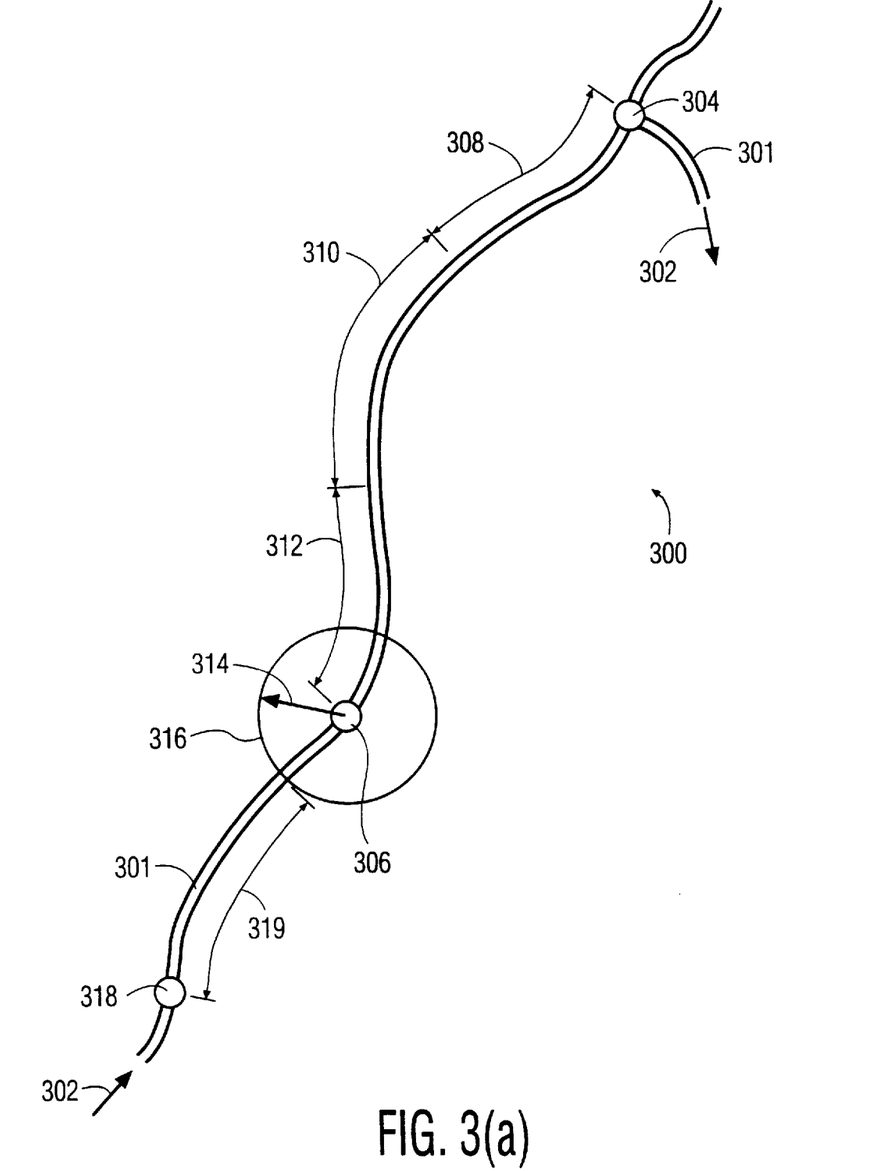
FIGS. 3(a)–3(c) depict example routes.

FIG. 3(a) depicts a section 300 of a typical route 301 determined by a navigation package. The direction of travel is indicated by arrows 302. The route 300 includes a turn (a right turn) at setpoint 304. This is a point on the route 300 at which the driver must change directions and for which a direction change instruction is provided by the navigation package. The longitude and latitude of the setpoint 304 is also provided by the navigation package. The point (speech point) at which the direction change instruction associated with the setpoint 304 are to be spoken can be determined in a number of different ways. FIG. 3(a) depicts a method in which the point at which an instruction is spoken is determined by traversing the route backwards along the path of travel. A target point 306 is determined by combining a distance/time 308 required for the driver to react to the instructions, a distance/time 310 required for speaking the instructions (see 210 of FIG. 2) and a distance/time 312 which provides a buffer for variations in road conditions, time of day, driver comfort, etc. as defined by the user. The reaction time can include the time it takes a user to prepare for a turn and can be a function of the expected turn type and road classification. For example, a right turn from an interstate highway may require more time for preparation than a right turn on a neighborhood street. The reaction time can be set by the user, if desired, but it is expected that a standard 25 seconds would be an acceptable reaction time. At the target point 306 an error radius 314 of distance/time is determined based on the maximum error in spatial position determination that is inherent in commercial GPS. The accuracy of the commercial GPS is about 100 meters and if the actual speed or speed limit is 30 meters per second the error is about 3.33 seconds. When the system 202 is positioned within this radius 314 of the target point 306, the system 100 is considered as having reached the target point. If the system 100 is traveling along the route 301, the system 100 will be within the circle 316 defined by the radius 314 at which time the directions will start being output as a voice signal to the user.

When the system is at a current position 318, the distance 319 that the system 100 must travel from the current position 318 to the circle 316, can be determined. From this distance and the estimated current speed, the time of travel between the current point 318 and the circle 316 can be determined and used with an elapsed time, determined with the laptop computer real time clock, to trigger the initiation of instruction output.

Figure 3B:
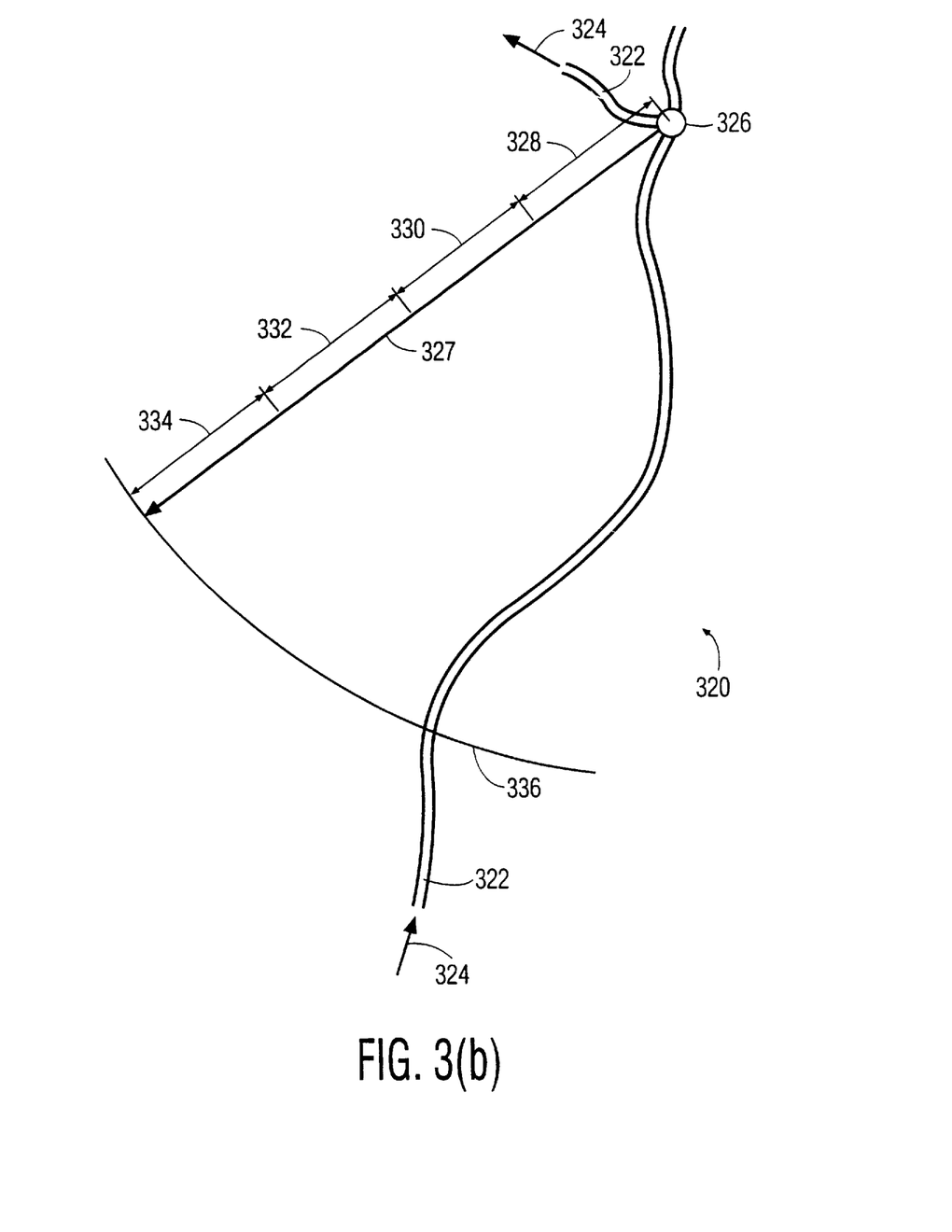

FIG. 3(b) depicts another way of determining the point at which the directions should be spoken. In this approach a section 320 of a route 322 with a left turn is shown when traveling in the direction of travel 324. The setpoint 326 (left turn) is the center of a radius 327 that includes reaction time/distance 328, the time/distance 330 required to speak the directions, the buffer time/distance 332 and the GPS error time/distance 334. When the system 100 is traveling along the route 322, the system 100 is within the radius 327 when the circle 336 is reached. The time required to travel from a current position to the circle 336 can also be used to trigger direction instruction output with this approach.

It is also possible to make the target point a distance from the setpoint equal to the driver reaction time plus the time to speak the directions with the radius around the target point being equal to the GPS error plus the buffer.

Carrying this one step further the target point can be based on the reaction time along with the radius being equal to the sum of the time to speak the instructions, the buffer and the GPS error. The above two possibilities are in between those disclosed in FIGS. 3(a) and 3(b). A combination of the above approaches can also be used to vote on when the voice instruction should be output.

Figure 3C:
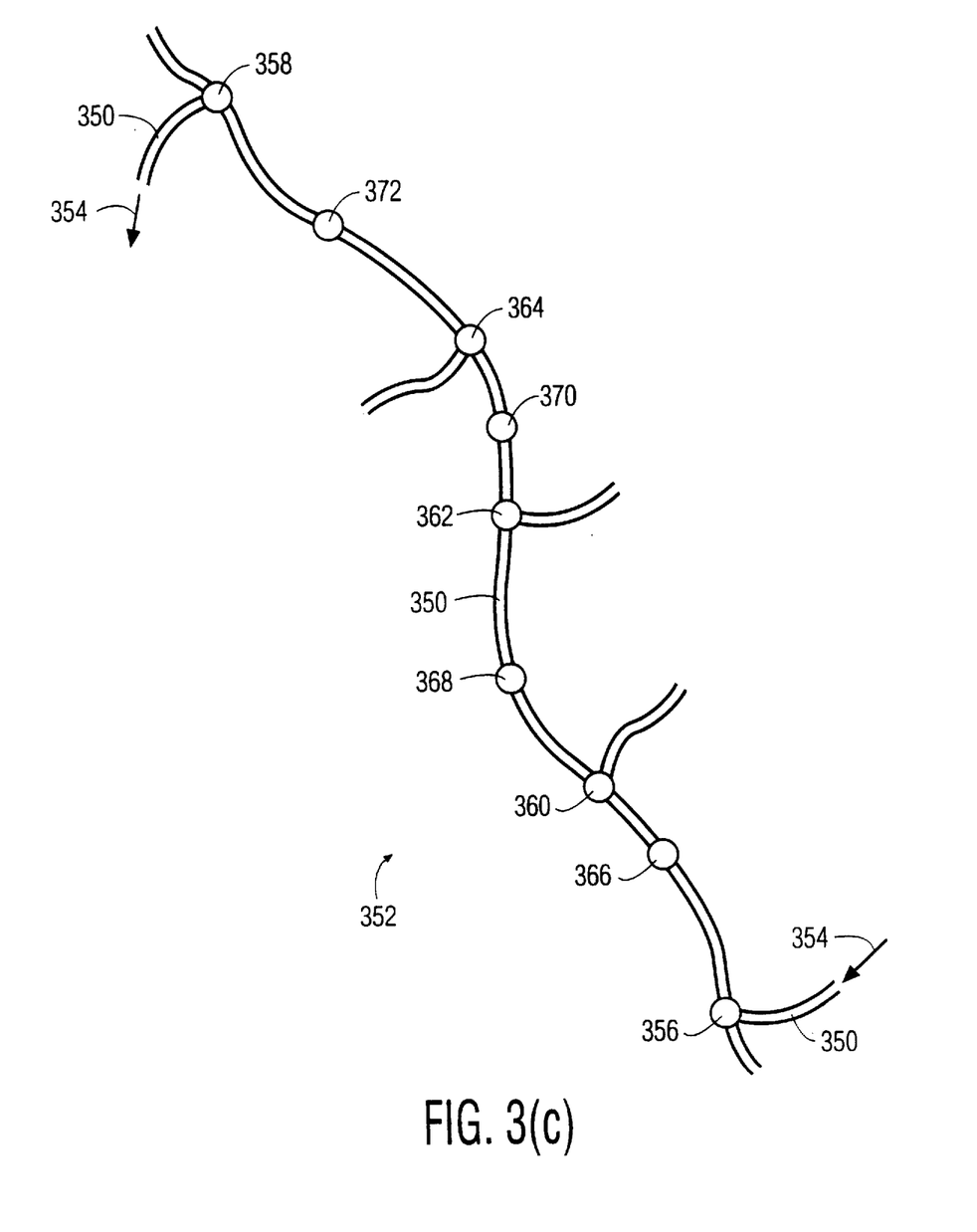

The system 202 can also determine progress points along an expected route 350. This is depicted in FIG. 3(c). FIG. 3(c) illustrates a section 352 of the route 350 where in the direction of travel 354 the driver encounters two turns or setpoints 356 and 358. Assume that the distance between setpoints 356 and 358 is relatively great such as 30 miles at interstate speed taking 30 minutes at the posted speed limit. The route 350 includes several exits 360, 362 and 364 which the driver is not supposed to take. A progress point is a spatial point (longitude and latitude) along the expected path. FIG. 3(c) depicts four progress points 366, 368, 370 and 372 positioned at a spacing determined by the navigation database and starting at the setpoint 356. Progress points can be used to determine whether the driver is off track or to anticipate upcoming turns. The number of progress points can be arbitrarily determined and as close together as desired. However, progress points spaced more closely together than the GPS positional error would not be appropriate.

Figure 4:
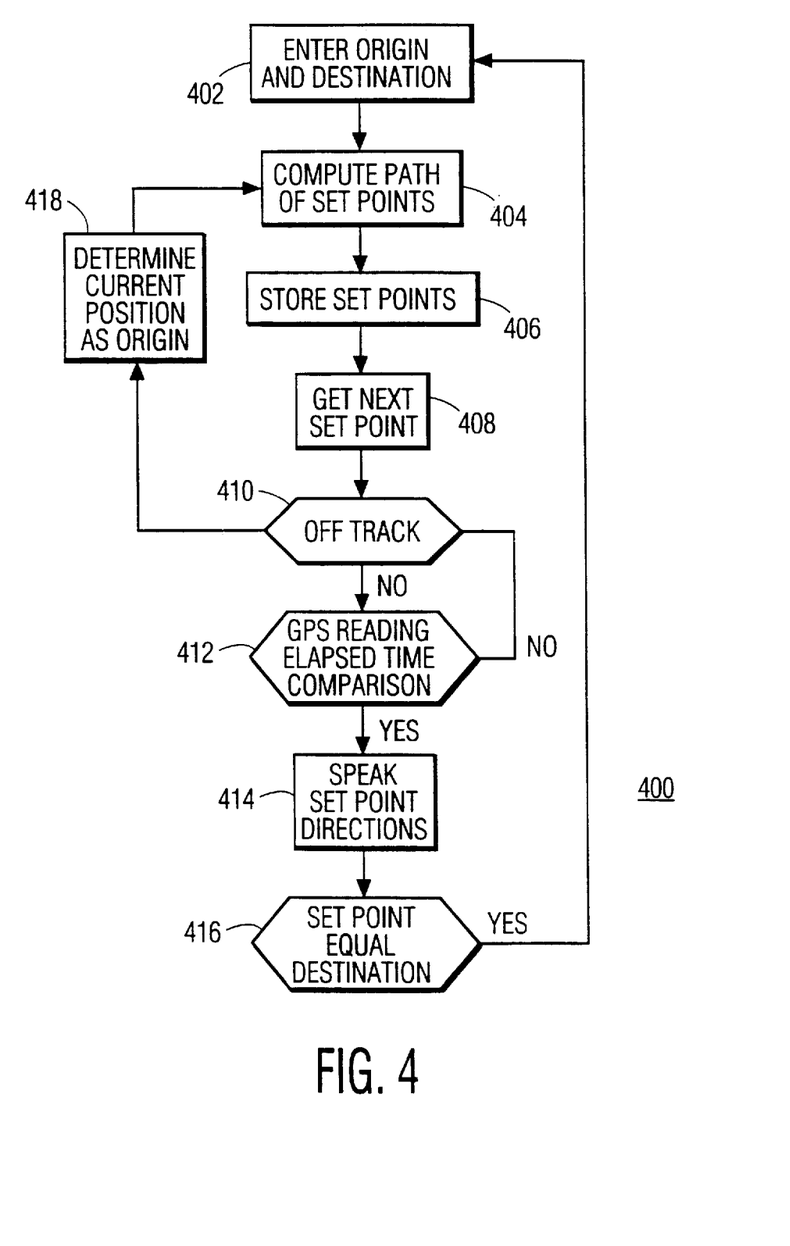
FIG. 4 depicts the flow of operation of the system of the present invention.

The process that is performed by the present invention in determining which direction to issue and when to issue the direction can be implemented in a number of different ways. One approach is illustrated in FIG. 4.

The process 400 starts with a step 402 of determining the origin and destination. The destination is entered by the user while the origin can be entered by the user or estimated by obtaining a current spatial position or reading from the GPS unit 118 and finding the map location of the spatial position in the electronic map. Because the commercial GPS includes the built in error in position determination, if the GPS is used to determine the origin the user should be allowed to confirm that the origin is correct and allowed to enter a correction. Once the origin and destination are known, in the next step 404, a path or route between the two points is conventionally determined. This route includes direction change points and the spatial positions or set points of the direction change points. These set points, along with the directions are stored, in a database, such as that illustrated in FIG. 2.

Once the set points are stored the system then enters a loop in which determinations are made as to when to speak the directions.

The first step 408 of the loop is to retrieve the next set point from the database 200. The information associated with the setpoint includes (see FIG. 2) the spatial positions 204 (longitude) and 206 (latitude), the ASCII text directions 202, optionally the phonetic representation 208 and the time 210 required to speak the instructions. In the first cycle through this loop this is the first set point of the array and in the second cycle it is the second set point, etc. That is, the system steps sequentially through the set points as they are encountered. The computer then monitors 410 the GPS position to determine if the driver has gotten off track. If off-track the system can determine 418 the current position as a new origin and return to the route determination step 404. If not off-track, the GPS reading is compared 412 to determine whether speaking of the corresponding instructions should be initiated. As noted above, this can be a comparison to the initiation point, a comparison to the distance (radius) from the target point or a comparison to the distance (radius) from the setpoint or a comparison to something in between. Because of the error in the GPS reading this is an inference that the instruction should be spoken.

The use of distances to infer when to initiate the speaking of the instructions is one way in which the process of the invention can be performed. A distance based process works well when the GPS is functioning. However, when the GPS is not functioning, such as when the satellites are obscured by tall buildings, the inference can be based on elapsed time. As previously discussed, it is possible to calculate the travel time required to travel from a spatial position determined based on a most recent GPS reading to the initiation point. This can be done using the posted speed or the most recent speed. It is also possible to determine an elapsed time since the last or most recent GPS reading using the real time clock. When the elapsed time exceeds the travel time, the system can infer that the initiation point has been reached and output the corresponding driving direction instruction.

The determination as to when to speak the directions can also be made using the progress points by determining a target progress point at which the directions should be spoken and then comparing the GPS position to the target progress points along the route.

As noted above, determinations made based on inferred distance and which require knowing the current position may not work well when the satellite signals are obscured. As a result, the time and distance inferences can be combined such that when the current position cannot be determined the last current position can be used to determine the time at which the direction can be spoken.

If two or more direction changes are located substantially next to each other, it is possible that the directions for each change will be triggered substantially simultaneously. If two or more set points have initiation points that are triggered simultaneously based on the position of the system 100, then the two sets of directions are output sequentially based on their order in the database 200 with no pause between them or with only a very small pause between them.

Once the directions are spoken for the set point, the system then determines 416 whether the set point is the destination, that is, whether the end of the array of set points in the database 200 has been reached. If so, the system returns to step 402 to await another origin and destination. If not the system returns to step 408 to get the next set point in the database 200 and perform the operations of the loop again. The current position in the database 200 can be tracked using a pointer or a position counter or other position tracking approaches known to those of skill in the art.

The determination 410 as to whether the driver has gotten off-track or is on the wrong path can be made in a number of different ways. The type of determination depends on how well the GPS is working. For example, as noted above, when navigating in a city between large buildings the GPS signal can be obscured. When the GPS is not working, the user can indicate that the system 100 is off-track. When the GPS is working several approaches can be used. One off-track determination approach is to calculate the time distance required to travel between set points and if that travel time distance is exceeded before the directions are spoken indicate an off-track condition. A further approach is to sequence through the progress points as the driver travels and if the driver exceeds a predetermined distance from the current progress point without encountering the next progress point, indicate an off-track condition. Another approach is to use two adjacent GPS readings to determine a direction of travel and compare it to the expected directions of travel along the portion of the route being traversed. If the direction or orientation of actual travel is wrong, for example, in the opposite direction from the expected direction, an off-track condition exists. Another approach is to infer the current location based on the speed limit on the portion of the route being traversed and determine the time that has elapsed since the most recent GPS reading and indicate an off-track condition if the inferred position is not on the route. Still another approach is to determine a street and a direction for each GPS reading and compare the street and direction to the expected route to determine whether the system is off-track. The approaches can also be combined. In each of these approaches it is preferred that the off-track condition be confirmed by a repeat of the detection of the condition two or three times (a variable threshold) with a small time period of, for example, a minute or two between each determination to ensure that the driver is indeed off-track. Unless the system 100 is sure that it is off-track, the system 100 should assume that it is on track.

The system has been described with respect to providing the driver with voice directions. The system is also capable of displaying the directions as text on the display 106 and of providing a moving map with an advance indication of the turn as well as the current position. The intersection of the turn can be shown enlarged with the turn highlighted. The system should also have the ability to allow the driver to indicate that one or more previously spoken directions should be repeated. The user should be able to easily reset the system, via an interrupt or the equivalent, so that a new origin is determined based on the current position when the user desires to do so. The user should also be given an opportunity to indicate that the user is not off-track when an off-track condition is indicated and the system will return to the loop processing discussed above. The system has also been described with respect to performing the determinations of distance/time dynamically as the system moves in real time along the route. It is possible to precompute the distances and times for the initiation of instruction output and store such in the database of the laptop computer. It is also possible to use differential GPS to more accurately infer position.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A portable computer system comprising:
   at least one computer readable storage medium embodying a geographical data base;
   output means for providing driving instructions;
   processing means adapted to perform the following operations:
   plan or maintain a route through the data base, the route being embodied on the at least one computer readable storage medium;
   infer a current position along the route, based on a previously known position, the route, and an estimated radius of error associated with a position detecting device;
   determine a first estimated time or distance before which a driving instruction must be effected, based on the current position, the route, and the estimated radius of error;
   determine a second estimated time or distance before which the driving instruction must be given to allow the driving instruction to be effected at the first estimated time;
   cause the output means to deliver the driving instruction at the second estimated time.

2. The system of claim 1 wherein the previously known position is based on received satellite data.

3. The system of claim 2 wherein the estimated radius of error is a known error in the satellite data.

4. The system of claim 1 wherein the previously known position is based on a user input.

5. The system of claim 1 wherein the operations of inferring the current position and determining the first and second estimated times or distances are based upon speed limits along the route.

6. The system of claim 1 wherein the operations of inferring the current position and determining the first and second estimated times or distances are based upon a known speed of the vehicle.

7. The system of claim 6 wherein the known speed is based upon satellite information received at at least two points in time.

8. The system of claim 1 wherein the operation of determining the second estimated time or distance includes taking into account a reaction time or distance of the driver.

9. The system of claim 1 wherein the operation of determining the second estimated time or distance includes taking into account a time or distance for delivering the driving instruction.

10. The system of claim 1 wherein the operation of determining the second estimated time or distance includes taking into account an expected error in the current position.

11. The system as recited in claim 1, wherein said portable computer system comprises a laptop computer system.

12. A computer method for issuing driving instructions comprising the steps of planning or maintaining a route through the data base, the route and the database being embodied in at least one computer readable storage medium;

inferring a current position along the route, based on a previously known position, the route, and an estimated radius of error associated with a position detecting device;

determining a first estimated time or distance before which a driving instruction must be effected, based on the current position, the route, and the estimated radius of error;

determining a second estimated time or distance before which the driving instruction must be given to allow the driving instruction to be effected at the first estimated time;

delivering the driving instruction to a user at the second estimated time.

13. A computer readable storage medium embodying computer process able code for executing the following steps:

planning or maintaining a route through the data base, the route and the database being embodied in at least one computer readable storage medium;

inferring a current position along the route, based on a previously known position, the route, and an estimated radius of error associated with a position detecting device;

determining a first estimated time or distance before which a driving instruction must be effected, based on the current position and the route;

determining a second estimated time or distance before which the driving instruction must be given to allow the driving instruction to be effected at the first estimated time;

delivering the driving instruction to a user at the second estimated time.

* * * * *